United States Patent
Loots et al.

(10) Patent No.: US 8,121,747 B2
(45) Date of Patent: Feb. 21, 2012

(54) FLIGHT MANAGEMENT SYSTEM, PROCESS, AND PROGRAM PRODUCT ENABLING DYNAMIC SWITCHING BETWEEN NON-PRECISION APPROACH MODES

(75) Inventors: Dennis David Loots, Scottsdale, AZ (US); Erwan Paricaud, Haute Garonne (FR); Yannick Thebault, Lacroix-Falgarde (FR)

(73) Assignee: Honeywell International Inc., Morristown, NJ (US)

( * ) Notice: Subject to any disclaimer, the term of this patent is extended or adjusted under 35 U.S.C. 154(b) by 66 days.

(21) Appl. No.: 12/536,395

(22) Filed: Aug. 5, 2009

(65) Prior Publication Data

US 2011/0035082 A1 Feb. 10, 2011

(51) Int. Cl.
*G06F 19/00* (2006.01)
(52) U.S. Cl. .............. 701/16; 701/1; 701/3; 701/14; 701/204; 701/206; 244/175; 244/183; 244/195; 244/196
(58) Field of Classification Search .................. None
See application file for complete search history.

(56) References Cited

U.S. PATENT DOCUMENTS

| | | | | |
|---|---|---|---|---|
| 6,112,141 | A * | 8/2000 | Briffe et al. | 701/14 |
| 6,154,693 | A | 11/2000 | Aberschitz et al. | |
| 6,188,937 | B1 * | 2/2001 | Sherry et al. | 701/14 |
| 6,314,343 | B1 | 11/2001 | Adams et al. | |
| 6,707,475 | B1 | 3/2004 | Snyder | |
| 7,084,785 | B2 * | 8/2006 | Rouquette et al. | 340/972 |
| 7,228,227 | B2 * | 6/2007 | Speer | 701/206 |
| 7,690,603 | B2 * | 4/2010 | Peyrucain et al. | 244/183 |
| 7,693,621 | B1 * | 4/2010 | Chamas | 701/16 |
| 7,715,955 | B2 * | 5/2010 | Tatham et al. | 701/16 |
| 2004/0183698 | A1 * | 9/2004 | Rouquette et al. | 340/972 |
| 2004/0245408 | A1 * | 12/2004 | Peyrucain et al. | 244/183 |
| 2006/0015247 | A1 * | 1/2006 | Speer | 701/206 |
| 2007/0129857 | A1 * | 6/2007 | Fortier | 701/16 |
| 2007/0225876 | A1 * | 9/2007 | Caillaud et al. | 701/16 |
| 2008/0004757 | A1 * | 1/2008 | Ingram et al. | 701/11 |
| 2008/0119970 | A1 | 5/2008 | Campbell et al. | |
| 2008/0172149 | A1 * | 7/2008 | Rouquette et al. | 701/16 |
| 2008/0319591 | A1 * | 12/2008 | Markiton et al. | 701/14 |
| 2009/0024261 | A1 * | 1/2009 | Rouquette et al. | 701/16 |
| 2009/0043434 | A1 * | 2/2009 | Deker | 701/16 |
| 2011/0077859 | A1 * | 3/2011 | Coulmeau et al. | 701/204 |

* cited by examiner

*Primary Examiner* — Khoi Tran
*Assistant Examiner* — Jonathan L Sample
(74) *Attorney, Agent, or Firm* — Ingrassia Fisher & Lorenz, P.C.

(57) ABSTRACT

Embodiments of a process and a program product are provided suitable for implantation by a flight management system (FMS), which is deployed onboard an aircraft and including a display device and a user interface. The FMS operable in a plurality of non-precision approach modes. In one embodiment, the process includes the steps of: (i) receiving data via the user interface designating an approach in a flight plan; (ii) enabling the pilot to utilize the user interface to select a non-precision approach mode from the plurality of non-precision approach modes if the designated approach is a non-precision approach; and (iii) placing the FMS in the selected non-precision approach mode during the designated approach.

9 Claims, 2 Drawing Sheets

FLIGHT MANAGEMENT SYSTEM, PROCESS, AND PROGRAM PRODUCT ENABLING DYNAMIC SWITCHING BETWEEN NON-PRECISION APPROACH MODES

TECHNICAL FIELD

The present invention relates generally to avionic display systems and, more particularly, to a flight management system, process, and program product enabling a pilot to dynamically switch between non-precision approach modes.

BACKGROUND

It is now common for a commercial aircraft to be equipped with a flight guidance and management system (FGMS), which includes a flight management system (FMS) and a flight guidance system (FGS) having an autopilot functionality. The FMS of a modern FGMS is often capable of operating in a precision approach mode, such as an "instrument landing system" or "ILS" mode, when both lateral (localizer) and vertical (glideslope) guidance is available. Vertical guidance, in particular, may be provided by a glideslope (G/S) antenna array, which is located near the runway touchdown zone and which broadcasts a G/S signal over a selected channel. Certain antennae in the array modulate a first component of the G/S at a first frequency (e.g., 90 hertz), while other antennae in the array modulate a second component of the G/S signal at a second frequency (e.g., 150 hertz). Collectively, the components of the G/S signal define a G/S beam, which originates from an anchor point at the runway's threshold and projects through the final approach fix. When in range of the G/S antenna array, the G/S signal is received by, for example, a multi-mode receiver deployed onboard the aircraft. The G/S signal permits the FGS autopilot to determine the location of the G/S beam and the aircraft's position relative thereto. The aircraft, whether controlled directly by the FGS autopilot or by the pilot utilizing visual queues provided on the primary flight display (PFD), can then be guided vertically along the G/S beam to ensure a safe and accurate landing.

When unable to operate in a precision approach mode due to, for example, lack of a G/S signal, the FMS may operate in a non-precision approach mode. In one known non-precision approach mode commonly referred to as a "flight management (FM) vertical guidance mode," the FMS utilizes data from available navigational aids (e.g., Air Data Computers, Inertial Reference Systems, non-directional beacons, global positioning systems, localizers, very high frequency omni-directional radio devices, and the like) to provide vertical guidance by continually calculating a target trajectory during a particular approach. Although compatible with virtually all approach types, including non-linear or curved approaches, the FM vertical guidance mode generally does not provide the same precision guidance capabilities and intuitive pilot controls as does the ILS mode described above. Thus, in an effort to replace the FM vertical guidance mode, a new non-precision approach mode (referred to herein as "an FMS landing system (FLS) approach mode") has been recently been developed and implemented that mimics the precision ILS approach mode. When the FMS is operating in the FLS guidance mode, the FGS autopilot utilizes data derived from systems onboard the aircraft to construct a virtual model of a G/S beam. The FMS, in conjunction with the FGS and other onboard systems, may then generate visual queues on the PFD or other cockpit display, which the pilot may utilize to vertically guide the aircraft to the runway in essentially the same manner as during an ILS approach.

Although providing a highly useful ILS-like functionality, the FLS guidance mode may be incompatible with certain approaches. For example, due to the manner in which the virtual G/S beam is modeled, the FLS guidance mode is generally incompatible with curved (e.g., S-shaped) approaches. In addition, the FLS guidance mode may be incompatible with approaches having low required navigational performance (RNP) values or approaches requiring adherence to RNP authorization required (AR) protocols. However, within a conventional flight management system, the FLS functionality is either wholly enabled or disabled within a configurable and separately-loadable flight manager Operational Program Configuration (OPC) software database or via a set of input configuration parameters; thus, after being activated during initial software configuration, the FLS guidance mode cannot be deactivated by a pilot or other member of the aircrew. Consequently, in instances wherein the FLS guidance mode cannot be utilized during a selected approach, the pilot may be forced to request and fly a new approach, which can add unnecessary delay and cost to the flight procedure. Alternatively, the pilot may be forced to fly the selected approach using a manual mode of operation (e.g., through manual selection of the Flight Path Angle target or selection of the Vertical Speed target).

There thus exists an ongoing need to provide embodiments of a flight management system, a process, and a program product that enable a pilot to dynamically switch between a FLS guidance mode and an FM vertical guidance approach mode after selection of a non-precision approach within a flight plan. Other desirable features and characteristics of the present invention will become apparent from the subsequent detailed description of the invention and the appended claims, taken in conjunction with the accompanying drawings and this background of the invention.

BRIEF SUMMARY

Embodiments of a process are provided that may be performed by a flight management system (FMS) deployed onboard an aircraft and including a display device and a user interface. The FMS operable in a plurality of non-precision approach modes. In one embodiment, the process includes the steps of: (i) receiving data via the user interface designating an approach in a flight plan; (ii) enabling the pilot to utilize the user interface to select a non-precision approach mode from the plurality of non-precision approach modes if the designated approach is a non-precision approach; and (iii) placing the FMS in the selected non-precision approach mode during the designated approach.

Embodiments of a program product are also provided for use in conjunction with an FMS deployed onboard an aircraft and including a display device and a user interface. The FMS is operable in a FMS landing system (FLS) guidance mode and a flight management (FM) vertical guidance mode. The program product includes an avionics flight management program and computer-readable media bearing the avionics display program. The avionics flight management program is adapted to: (i) receive data via the user interface designating an approach in a flight plan; (ii) enable the pilot to utilize the user interface to select one of the FLS guidance mode and the FM vertical guidance mode in which the FMS is to operate during the designated approach if the designated approach is a non-precision approach; and (iii) place the FMS in the selected guidance mode during the designated approach.

Still further embodiments of an FMS are provided suitable for deployment onboard an aircraft and operable in an FLS guidance mode and an FM vertical guidance mode. In one embodiment, the FMS includes a display device, a user interface, and a controller coupled to the display device and the user interface. The controller is configured to: (i) receive data via the user interface designating an approach in a flight plan; (ii) enable the pilot to utilize the user interface to select one of the FLS guidance mode and the FM vertical guidance mode in which the FMS is to operate during the designated approach if the designated approach is a non-precision approach; and (iii) place the FMS in the selected guidance mode during the designated approach.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
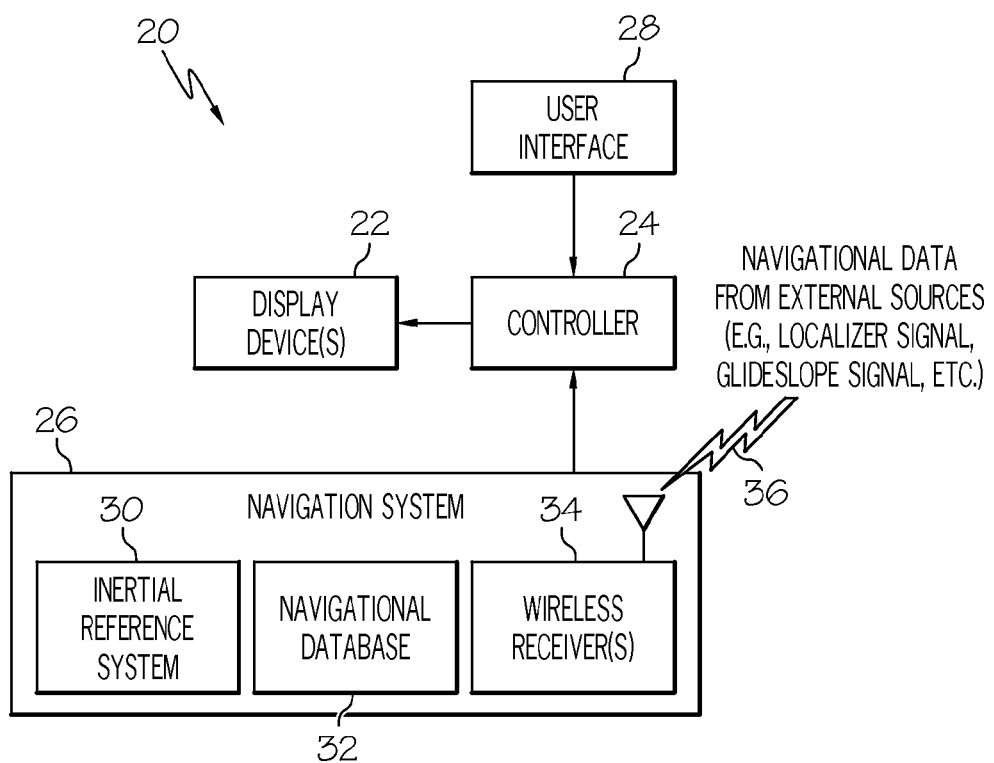
FIG. 1 is functional block diagram of a generalized flight management system operable in a precision approach mode and at least two non-precision approach modes in accordance with an exemplary embodiment.

FIG. 1 is a functional block diagram of a generalized flight management system (FMS) 20 in accordance with an exemplary embodiment of the present invention. FMS 20 is conveniently included within a flight guidance and management system (FGMS), which further includes a flight guidance system (not shown) having an autopilot functionality. In actual implementations, FMS 20 and the flight guidance system are typically self-sufficient systems each comprised of a number of independent hardware components; however, FMS 20 and the flight guidance system may be disposed within a common housing for weight savings and may share a common power supply. FMS 20 is operable in at least one precision approach mode, namely, a landing system ("xLS") approach mode, such as an instrument landing system ("ILS") approach mode. In addition, FMS 20 is operable in at least two non-precision approach modes, namely, (i) a flight manager (FM) vertical guidance mode (also referred to as a "final descent mode" in certain contexts), and (ii) a FMS landing system approach mode or "FLS guidance" mode. Each of these approach modes has been briefly described above in the foregoing section entitled "Background" and is conventionally known within the avionics industry; a detailed discussion of these approach modalities is thus considered unnecessary at this juncture.

In the exemplary embodiment illustrated in FIG. 1, FMS 20 includes at least one display device 22, a controller 24, a navigational system 26, and a user interface 28. Controller 24 includes first and second inputs, which are operatively coupled to an output of user interface 28 and to an output of navigation system 26, respectively. Controller 24 also includes an output, which is operatively coupled to an input of display device 22. During operation of FMS 20, controller 24 drives display device 22 to generate a display screen thereon, which visually expresses various navigational information pertaining to the host aircraft. Display device 22 may assume the form of a Head-Down Display (HDD) or a Head-Up Display (HUD) included within an Electronic Flight Instrument System (EFIS). Alternatively, display device 22 may assume the form of a primary flight display (FPD), a navigational display, a multi-functional display (MFD), a multipurpose control display unit (MCDU), or other display commonly included within a flight management system. In still further embodiments, display device 22 may be worn by members of the aircrew.

Controller 24 may comprise, or be associated with, any suitable number of individual microprocessors, power supplies, storage devices, interface cards, auto flight systems, flight management computers, and other standard components known in the art. In this respect, controller 24 may include or cooperate with any number of software programs (e.g., flight management programs) or instructions designed to carry out the various methods, process tasks, calculations, and control/display functions described below. In a preferred embodiment, controller 24 assumes the form of a Flight Management Computer.

User interface 28 may assume any form suitable for receiving input data from pilot or other aircrew member necessary to select a non-precision guidance mode in the manner described below. For example, user interface 28 can comprise one or more cursor devices, such as a mouse, trackball, touchpad, or keyboard-mounted knob (commonly referred to as a "pointing stick") disposed on or adjacent display device 22 and enabling the pilot to interact with a graphical user interface produced on display device 22. As a further example, user interface 28 may comprise a plurality of buttons (e.g., an alphanumeric keypad and a number of line-in buttons) provided on a Flight Management Computer. As a still further example, user interface 28 may assume the form of a switch, button, dial, or basic user input device disposed at any suitable location within the aircraft cockpit.

In the illustrated example shown in FIG. 1, navigational system 26 includes an inertial reference system 30, a navigational database 32, and at least one wireless receiver 34. Inertial reference system 30 and wireless receiver 34 provide controller 24 with navigational information derived from sources onboard and external to the host aircraft, respectively. More specifically, inertial reference system 30 provides controller 24 with information describing various flight parameters of the host aircraft (e.g., position, orientation, velocity, etc.) as monitored by a number of motion sensors (e.g., accelerometers, gyroscopes, etc.) deployed onboard the aircraft. By comparison, and as indicated in FIG. 1 at 36, wireless receiver 34 receives navigational information from various sources external to the aircraft. These sources may include various types of navigational aids (e.g., global position systems, non-directional radio beacons, very high frequency omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 34 may also periodically receive Automatic Dependent Surveillance-Broadcast (ADS-B) data from neighboring aircraft. In one specific implementation, wireless receiver 34 assumes the form of a multi-mode receiver (MMR) having global navigational satellite system capabilities.

Navigational database 32 stores a considerable volume of information useful in flight planning. For example, navigational database 32 can contain information pertaining to the geographical location of waypoints and lists of available approaches that may be flown by an aircraft when landing at a particular runway. During flight planning, a pilot may utilize user interface 28 to designate a desired approach from a list of available approaches stored in navigational database 32. After the pilot designates the desired approach, controller 24 may then recall from navigational database 32 relevant information pertaining to the designated approach (e.g., whether the approach is a precision or non-precision approach, whether the approach requires adherence to RNP or RNP AR protocols, etc.), which controller 24 may then utilize in carrying out the non-precision approach mode selection process described below.

After pilot designation of a non-precision approach, a conventional flight management system restricts operation to whichever non-precision guidance mode the FMS has been preconfigured to operate. In contrast to conventional flight management systems, FMS 20 enables a pilot to dynamically switch between non-precision approach modes, and specifically between an FLS guidance mode and an FM vertical guidance mode, after designation of a non-precision approach in a flight plan. In this manner, FMS 20 permits a pilot to activate the FM vertical guidance mode when flying a non-precision approach that is unsuitable for the FLS guidance mode, such as an approach having a curved (e.g., S-shaped) geometry, an approach having a low RNP value, or an approach requiring adherence to RNP AR protocols. Although FMS 20 may be configured to permit a pilot to dynamically switch between a FLS guidance mode and a FM vertical guidance mode in a number of different manners, it is preferred that FMS 20 activates, by default, the FLS guidance mode upon selection of a non-precision approach. A pilot may then utilize user interface 28 to deactivate the FLS mode, and thus revert to the FM vertical guidance mode, when appropriate. To further emphasize this point, an exemplary embodiment of such a process for selecting between non-precision guidance modes by selectively deactivating a default FLS guidance mode is described below in conjunction with FIG. 2.

Figure 2:
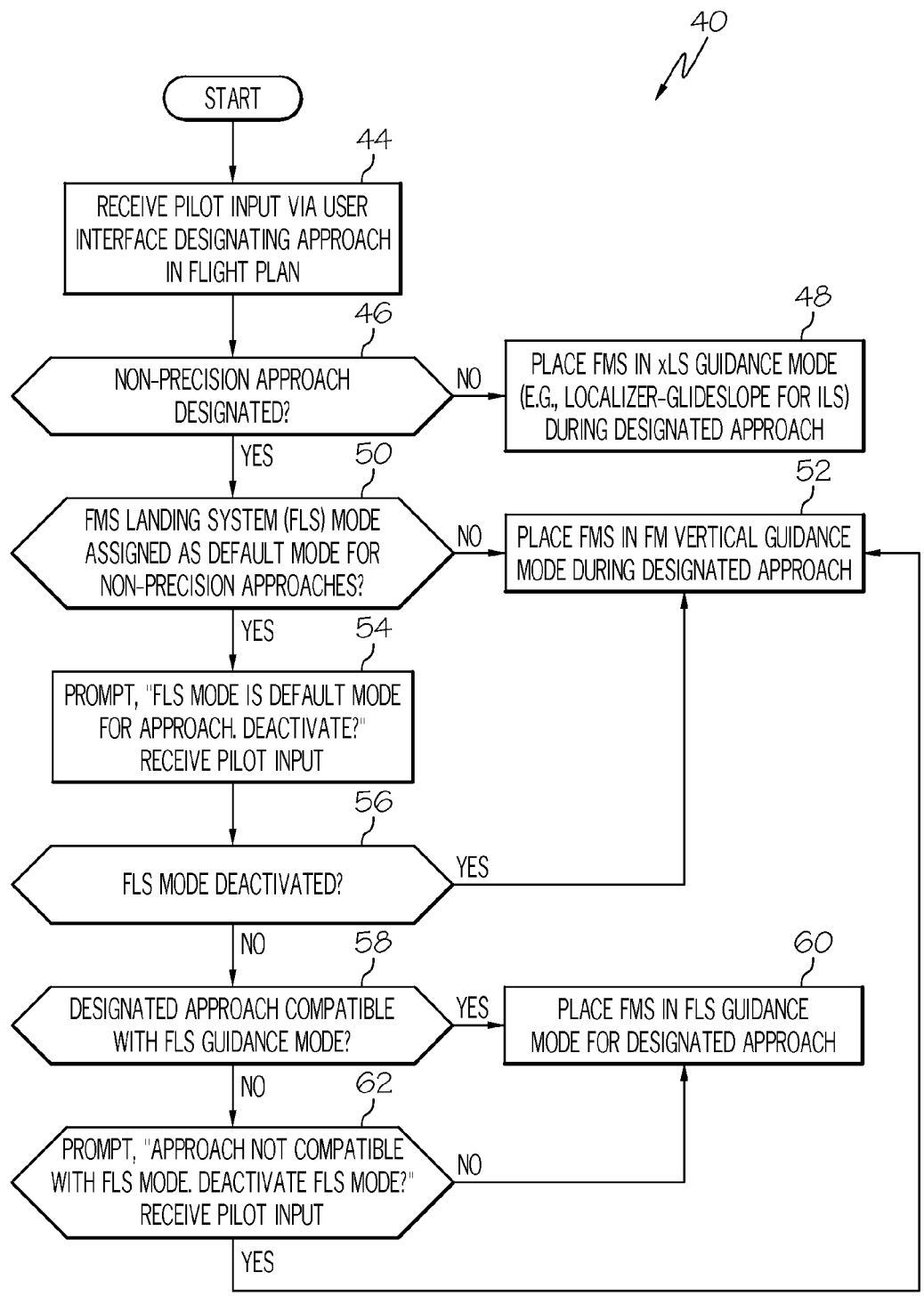
FIG. 2 is a flowchart illustrating an exemplary process that may be carried out by the flight management system shown in FIG. 1 to enable a pilot to dynamically switch between the non-precision approach modes.

FIG. 2 is a flowchart illustrating an exemplary flight management process 40 that may be performed by controller 24 of FMS 20 (FIG. 1) to enable a pilot to deactivate a default mode assigned to non-precision approaches (e.g., the FLS mode) and thus revert to a secondary non-precision approach mode (e.g., the FM vertical guidance mode) suitable for navigating approaches that are potentially incompatible with the FLS mode. Referring to FIG. 2 in conjunction with FIG. 1, exemplary process 40 commences with the reception of pilot selection data designating an approach to be flown by the aircraft (STEP 44, FIG. 2). Pilot selection data may be received via user interface 28, which, as noted above, may include a group of alphanumeric and line-in buttons disposed on a Flight Management Computer. Next (STEP 46, FIG. 2), controller 24 identifies whether the designated approach is a non-precision approach. As indicated above, controller 24 may conveniently determine whether the designated approach is a non-precision approach by reference to data stored in navigational database 32 and associated with the designated approach.

If, during STEP 46, controller 24 determines that the designated approach is a precision approach, and thus not a non-precision approach, controller 24 places FMS 20 in a precision guidance mode (e.g., an ILS mode) during the designated approach (STEP 48, FIG. 2), and process 40 concludes. However, if controller 24 instead determines that the designated approach is a non-precision approach, controller 24 next identifies whether the FLS mode has been assigned as the default mode for non-precision approaches (STEP 50, FIG. 2). Controller 24 may identify whether the FLS mode is the default non-precision mode by reference to an Operational Program Configuration (OPC) software database stored in a memory included within FMS 20. If the FLS guidance mode is not assigned as the default mode, controller 24 places FMS 20 in the FM vertical guidance mode for the designated approach (STEP 52, FIG. 2), and process 40 concludes. If controller 24 instead determines that the FLS guidance mode is assigned as the default non-precision mode, controller 24 advances to STEP 54 described below.

During STEP 54, controller 24 generates an alert indicating that the FLS guidance mode is the default mode for the upcoming non-precision approach. The alert may also inform the pilot that the FLS guidance mode can be deactivated, if desired. Although the alert may an audible alarm or a prerecorded message, it is preferred that the alert assumes the form of a graphic generated on display device 22. For example, as indicated in FIG. 2, controller 24 may generate a text message on display device 22, such as "FLS MODE IS DEFAULT MODE FOR APPROACH. DEACTIVATE?" After generating an alert in this manner, controller 24 awaits the reception of pilot input via user interface 28 requesting deactivation of the FLS guidance mode (STEP 56, FIG. 2). If receiving pilot input deactivating the FLS mode within a predetermined time period, controller 24 places FMS 20 in the FM vertical guidance mode for the designated approach, and process 40 concludes. Otherwise, controller 24 advances to STEP 58 of process 40 during which controller 24 determines whether the designated approach is compatible with the FLS guidance mode. The foregoing example notwithstanding, controller 24 may not generate an alert during STEP 54 in alternative embodiments of flight management process 40.

During STEP 58, controller 24 may determine whether the designated approach is compatible with the FLS guidance mode in a number of different manners. For example, controller 24 may determine whether the designated approach is compatible with the FLS guidance mode by referencing navigational database 32 to determine whether RNP or RNP AR protocols are associated with the designated approach. If the approach requires adherence to RNP AR protocols, controller 24 may determine that the designated approach is incompatible with the FLS guidance mode. Alternatively, if the approach requires adherence to RNP AR or RNP protocols, controller 24 may determine that the designated approach is incompatible with the FLS guidance mode only if the RNP value assigned to the approach exceeds a predetermined minimum threshold (e.g., an RNP value of 2.0).

Controller 24 may also determine whether a designated approach is compatible with the FLS guidance mode during STEP 58 by analyzing the geometry of the designated approach. More specifically, controller 24 may determine whether the approach designated approach is a curved (e.g., S-shaped) approach and, therefore, generally incompatible with the FLS guidance mode. Controller 24 may determine whether the designated approach is substantially straight-in, and thus not curved, by comparing the approach path definition with the final approach leg axis. If the approach path definition is substantially aligned with the final approach leg axis, controller 24 concludes that the FLS guidance mode is compatible with the designated approach and subsequently places FMS 20 in the FLS guidance mode during the designated approach (STEP 60, FIG. 2). Conversely, if the approach path definition is not substantially aligned with the final approach leg axis, controller 24 concludes that the FLS guidance mode is incompatible with the designated approach.

If determining that the designated approach is incompatible with the FLS guidance mode (STEP 58), controller 24 advances to STEP 62 and generates an alert. Although the alert generated at STEP 62 may be audible or haptic, the alert is preferably a visual alert (e.g., a warning light). For example, as indicated in FIG. 2, the alert may comprise a textual message generated on display device 22, such as "APPROACH NOT COMPATIBLE WITH FLS MODE. DEACTIVATE FLS GUIDANCE MODE?" If pilot input is not received via user interface 28 requesting deactivation of the FLS guidance mode, controller 24 places FMS 20 in the FM vertical guidance mode during the designated approach (STEP 52, FIG. 2). Otherwise, controller 24 places FMS 20 in the FLS guidance mode (STEP 60, FIG. 2), and process 40 concludes. In this manner, process 40 permits a pilot to utilize user interface 28 to selectively deactivate the default FLS mode, and thus activate the FM vertical guidance mode, after selection of a desired non-precision approach.

In view of the above, it should be appreciated that there has been provided an exemplary embodiment of a flight management system and process that enables a pilot to dynamically switch between a FLS guidance mode and an FM vertical guidance approach mode after selection of a non-precision approach within a flight plan. While the foregoing exemplary embodiment was described above in the context of a fully functioning computer system (i.e., flight management system 20 shown in FIG. 1), those skilled in the art will recognize that the mechanisms of the present invention are capable of being distributed as a program product (i.e., an flight management program) and, furthermore, that the teachings of the present invention apply to the program product regardless of the particular type of computer-readable media (e.g., floppy disc, hard drive, memory card, optical disc, etc.) employed to carry-out its distribution.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A process to be carried out by a flight management system (FMS) deployed onboard an aircraft and including a display device and a user interface, the FMS operable in a plurality of non-precision approach modes including a FMS landing system (FLS) guidance mode, the process comprising the steps of:
   establishing the FLS guidance mode as the non-precision approach default mode;
   receiving data via the user interface designating an approach in a flight plan;
   enabling a pilot to utilize the user interface to deactivate the FLS guidance mode if the designated approach is a non-precision approach;
   determining whether the designated approach is compatible with the FLS guidance mode based, at least in part, on the linearity of an approach path definition;
   generating an alert on the display device if the designated approach is determined to be incompatible with the FLS guidance mode and the FLS guidance mode is not deactivated via the user interface; and
   placing the FMS in the selected non-precision approach mode during the designated approach if the designated approach is determined to be compatible with the FLS guidance mode and the FLS guidance mode is not deactivated via the user interface.

2. A process according to claim 1 wherein the step of determining comprises determining whether the designated approach is compatible with the FLS guidance mode based, at least in part, on the linearity of the approach path definition and the required navigational performance (RNP) authorization required (AR) status of the designated approach.

3. A process according to claim 1 wherein the step of determining comprises:
   comparing the alignment of the approach path definition with the final approach leg axis; and
   determining that the geometry of the designated approach is incompatible with the FLS guidance mode if the approach path definition generally does not align with the final approach leg.

4. A process according to claim 1 further comprising the step of confirming activation of the FLS guidance mode if the designated approach is incompatible with the FLS guidance mode.

5. A program product for use in conjunction with a flight management system (FMS) deployed onboard an aircraft and including a display device and a user interface, the FMS operable in a flight landing system (FLS) guidance mode and a flight management (FM) vertical guidance mode, the program product comprising:
   an avionics flight management program adapted to perform the following steps when the FLS guidance mode is established as the non-precision approach default mode:
   receive data via the user interface designating an approach in a flight plan;
   enable a pilot to utilize the user interface to deactivate the FLS guidance mode if the designated approach is a non-precision approach;
   determine whether the designated approach is compatible with the FLS guidance mode based, at least in part, on the linearity of an approach path definition;
   generate an alert on the display device if the designated approach is determined to be incompatible with the FLS guidance mode; and
   place the FMS in the selected guidance mode during the designated approach if the designated approach is determined to be compatible with the FLS guidance mode and the FLS guidance mode is not deactivated via the user interface; and
   computer-readable media bearing the avionics flight management program.

6. A program product according to claim 5 wherein the avionics flight management program is adapted to determine whether the designated approach is compatible with the FLS guidance mode by based, at least in part, on the linearity of the approach path definition and on whether the designated approach requires adherence to required navigational performance (RNP) authorization required (AR) procedures.

7. A program product according to claim 5 wherein the avionics flight management program is adapted to determine whether the designated approach is compatible with the FLS guidance mode by comparing the alignment of the approach path definition with the final approach leg axis.

8. A flight management system (FMS) for deployment onboard an aircraft, the FMS operable in a flight landing system (FLS) guidance mode and a flight management (FM) vertical guidance mode, the FMS comprising:
   a display device;
   a user interface; and
   a controller coupled to the display device and the user interface, the controller configured to perform the following steps when the FLS guidance mode is established as the non-precision approach default mode: (i) receive data via the user interface designating an approach in a flight plan; (ii) enable the pilot to utilize the user interface to deactivate the FLS guidance mode if the designated approach is a non-precision approach; (iv) determine whether the designated approach is compatible with the FLS guidance mode based, at least in part, on the linearity of an approach path definition; (v) generate an alert on the display device if the designated approach is determined to be incompatible with the FLS guidance mode; and (vi) place the FMS in the selected guidance mode during the designated approach if the designated approach is determined to be compatible with the FLS guidance mode and the FLS guidance mode is not deactivated via the user interface.

9. An FMS according to claim 8 wherein the controller is further configured to determine whether the designated approach is compatible with the FLS guidance mode by comparing the alignment of the approach path definition with the final approach leg axis.

* * * * *